United States Patent [19]

Nigol et al.

[11] 4,391,125

[45] Jul. 5, 1983

[54] METHOD AND APPARATUS FOR TESTING AND/OR ADJUSTING VIBRATION ABSORBER FOR SUSPENDED CABLES

[75] Inventors: Olaf Nigol, Etobicoke; Herbert J. Houston, Oakville, both of Canada

[73] Assignee: Slater Steel Industries Limited, Hamilton, Canada

[21] Appl. No.: 272,163

[22] Filed: Jun. 10, 1981

[51] Int. Cl.³ ............................................. G01M 19/00
[52] U.S. Cl. ........................................... 73/11; 73/574; 73/579; 174/42

[58] Field of Search ................... 174/42; 73/1 DV, 11, 73/570, 574, 579, 432 K, 432 SD, DIG. 1

Primary Examiner—Laramie E. Askin
Attorney, Agent, or Firm—Burgess, Ryan and Wayne

[57] ABSTRACT

A pendulum type vibration absorber tester/adjuster, which enables vibration absorbers to be set to a desired damping in the factory. The test/adjustment is effected by mathematically determining the pendulum weight and arm length, setting the pendulum into motion and recording the motion on a chart recorder, and adjusting the damping of the absorber until a predetermined decrement is obtained.

12 Claims, 3 Drawing Figures

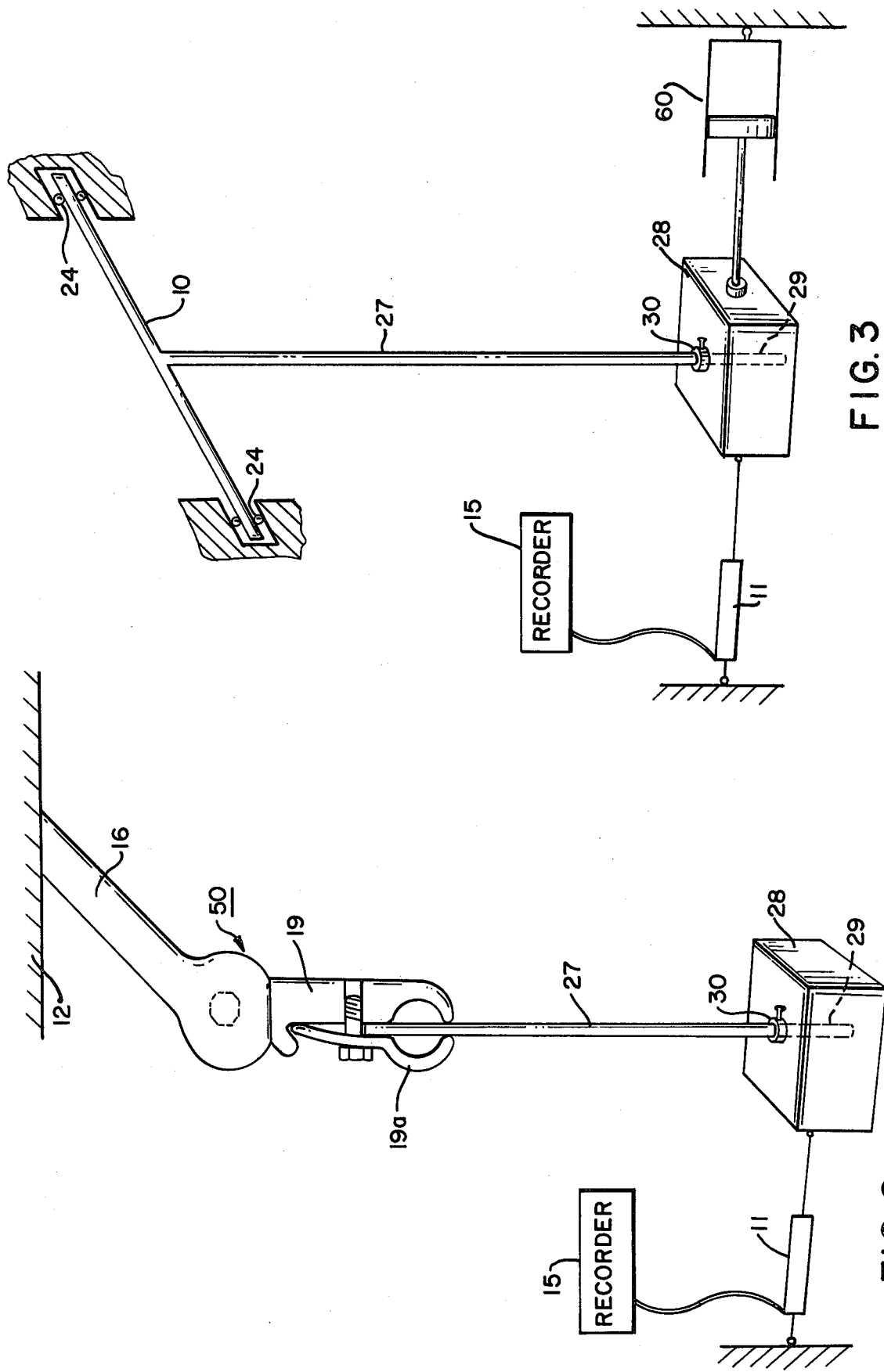

METHOD AND APPARATUS FOR TESTING AND/OR ADJUSTING VIBRATION ABSORBER FOR SUSPENDED CABLES

BACKGROUND OF THE INVENTION

This application relates to an improved method and apparatus for testing and/or adjusting vibration absorbers for suspended cables, i.e., devices for absorbing energy to suppress mechanical subspan oscillation and aeolian vibration of such cables.

The testing arrangement herein described is particularly suitable for, but not limited to, testing of vibration absorbers operating on the principles disclosed in copending U.S. patent application Ser. No. 147,096, filed May 7, 1980, now U.S. Pat. No. 4,346,255, assigned to the assignee of the present application and entitled "Overhead Electrical Conductor System Including Subspan Oscillation And Aeolian Vibration Absorber For Single And Bundle Conductors". This prior application discloses and claims an essentially dissipative (as opposed to spring-type) vibration absorber, having a damping mechanical impedance which essentially matches that of the transmission line to which the damper is attached. The acceptacle range of damping impedance of the absorber is indicated as being anywhere between half and twice the transmission line mechanical impedance; although we have found that satisfactory performance may be obtained with a damping impedance as high as three times the transmission line mechanical impedance.

By essentially matching the transmission line mechanical impedance, and providing a dissipative (i.e., frequency independent) damping effect, the vibration absorber of the aforesaid U.S. Pat. No. 4,346,255 provides optimum energy coupling between the transmission line and absorber, thus effectively absorbing travelling waves on the line before they build up to large amplitude standing waves which can cause damage to the line and associated supporting elements.

In order to test such vibration absorbers (as well as those of the type described, e.g., in U.S. Pat. No. 3,885,086), and to adjust them to the proper damping value, a full scale test line comprising a span of suspended cable is normally required. Such a test arrangement is necessarily complicated and costly.

One such testing method consists of exciting a suspended cable span from a variable frequency force generator and measuring the displacement of the cable at the standing wave maxima and minima over a band of resonant frequencies, with and without the vibration absorber in place. Another variation of this method is to measure the power input to the cable span at the resonant frequencies and at specified cable displacements with and without the vibration absorber in place. Since both the cable displacements and the power input to the span depend on the location of the force generator and the vibration control device within the span, the above measurements give only a relative measure of absorber effectiveness and not the actual damping value. Consequently, the results are of very limited use. For example, it would not be possible to adjust the damping of a vibration absorber to a desired value by this method.

Another method of comparing different vibration absorbers consists of displacing the cable in the test span, releasing and allowing it to oscillate. From the record of the resultant decaying oscillation the term known as the logarithmic decrement $\sigma$ is calculated. This decrement is obtained by taking the natural logarithm of the ratio of successive displacement amplitudes in time, i.e., amplitudes which are one cycle apart. When these measurements are made with and without the vibration absorber, a relative measure of their effectiveness can be established. However, this type of test can only be carried out at the fundamental and perhaps at the second harmonic frequency of the span. The measured displacements depend on the vibration absorber location and on the location of the measurement transducer. Since the results do not give the numerical value of the damping, this method is not useful in adjusting the damping to a particular value.

Accordingly, an object of the present invention is to provide a suspended cable vibration absorber testing and/or adjusting arrangement which is relatively simple and which can be carried out in an indoor testing facility and in a relatively small space.

SUMMARY

As herein described, there is provided a method for adjusting a vibration absorber to be used to absorb vibration from a suspended cable, comprising the steps of providing a pendulum having a radius of gyration and weight sufficient to cause the pendulum to oscillate at a desired test frequency with a selected logarithmic decrement when coupled to a vibration absorber having a desired damping; coupling said vibration absorber to said pendulum to damp any oscillation thereof; setting the pendulum into oscillation; and adjusting the damping of said vibration absorber to cause the logarithmic decrement of said oscillation to be substantially equal to said selected logarithmic decrement.

Also herein described is an apparatus for testing and/or adjusting a vibration absorber to be used to absorb vibration from a suspended cable, comprising a pendulum; means for adjusting the weight and radius of gyration of said pendulum; means for coupling said vibration absorber to said pendulum so as to damp any oscillation of said pendulum; means for sensing the amplitude of oscillation of said pendulum; and display means coupled to said sensing means for displaying information indicative of the logarithmic decrement of said oscillation.

IN THE DRAWING

FIG. 2 shows a torsional pendulum testing arrangement for torsional type vibration absorbers in accordance with one embodiment of the invention; and FIG. 3 shows a pendulum testing arrangement for linear type vibration absorbers in accordance with an alternative embodiment of the invention.

DETAILED DESCRIPTION

Figure 1:
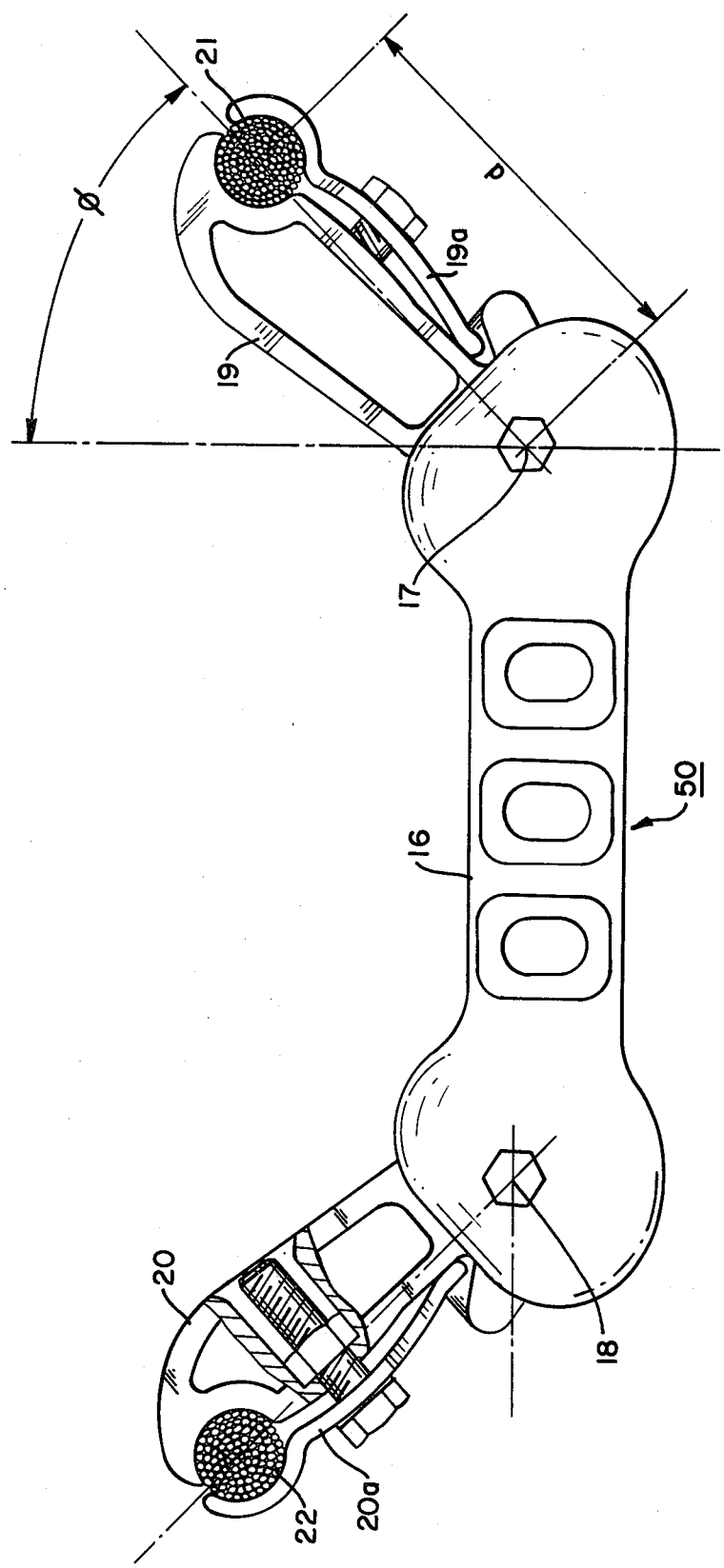
FIG. 1 shows a vibration absorber of a type to be tested according to one embodiment of the invention.

Aeolian vibration and sub-conductor oscillation derive their excitation from the minute forces associated with the release of vortices on the leeward side of conductors and cables when they are subjected to a steady air flow across their surfaces. It is believed that the excitation of aeolian vibration is derived from the detachment of the vortices and that sub-conductor oscillation is derived from the flow of the released vortices past the leeward conductor.

This release of vortices produces travelling waves which proceed along the span in opposite directions from their origin towards the suspension points. These waves in turn release other vortices to reinforce and amplify the wave motion. When the travelling wave arrives at the suspension point of the conductor, that is the attachment point of the conductor to the supporting structure, it is reflected with a 180° phase reversal due to the rigidity of the support point. The damping characteristics of the conductor and the suspension hardware are very small, so that attenuation of the travelling waves is also very small. This allows the travelling wave to make a large number of passes in a given span to thereby generate a standing wave having an amplitude of constant value, the amplitude being determined by the total damping of the system.

The aforementioned vibration phenomena may be avoided by preventing the formation of a standing wave rather than attempting to control the amplitude of the standing wave. Since it is not feasible to prevent vortex detachment, the invention described in U.S. Pat. No. 4,346,255 provides an absorber which will absorb the travelling wave and prevent its reflection back along the conductor. This is achieved by matching the dissipative impedance of the absorber with the characteristic mechanical impedance of the conductor.

The characteristic mechanical impedance of a conductor is defined as the ratio of force and velocity amplitudes of the travelling waves. Since the mechanical impedance of the conductor is a function of the tension in the conductor and the mass of the conductor per unit length, an absorber can be designed to match the mechanical impedance of the conductor for any given installation. Further, because the use of a dissipative damper for absorbing the wave does not require a frequency dependent resilient system, the absorber may be placed at any convenient location along the span of the conductor and not, as previously described, just at $\lambda/4$ wavepoints of the center aeolian frequency of the conductor.

Under ideal conditions where the absorber is installed at any point on the conductor, the absorber impedance or damping $D_s$ should be $k\sqrt{Tm}$, where T is the tension of the conductor, m is the mass of the conductor per unit length, and k is a damping parameter which, under the aforementioned ideal conditions, equals 2.0 to reflect the fact that the conductor extends in both directions from the absorber. It has been found that significant improvements in vibration control may be achieved by selecting an absorber impedance or damping in the range of 0.5 $\sqrt{Tm}$ to 3 $\sqrt{Tm}$, where $\sqrt{Tm}$ is the mechanical impedance of the suspended conductor. Thus, increases in T and m due to icing of the conductors will not unduly affect the operation of the absorber.

This principle may be applied to sub-conductor oscillation by utilizing the inertial mass of other bundle conductors to provide support for the damping member. Thus, by arranging a rotary action type vibration absorber at an angle of 45° or at least in the range of 30° to 60° from the vertical and horizontal planes, it will absorb the travelling waves associated with the build-up of both vertical aeolian vibration and horizontal sub-conductor oscillation.

Spacer-damper type vibration absorbers which operate in the aforementioned manner, viz., by interconnection between two adjacent cables or bundle conductors are described in co-pending U.S. patent applications Ser. No. 216,870, filed Dec. 16, 1980 (abandoned in favor of continuation-in-part application Ser. No. 300,751, filed Sept. 10, 1981); Ser. No. 249,488, filed Mar. 31, 1981 (abandoned in favor of continuation-in-part application Ser. No. 300,752, filed Sept. 10, 1981 now U.S. Pat. No. 4,362,900); and Ser. No. 249,425, filed Mar. 31, 1981 (abandoned in favor of continuation-in-part application Ser. No. 300,926, filed Sept. 10, 1981 now U.S. Pat. No. 4,362,901), all assigned to the assignee of the instant application. These vibration absorbers are of the torsional type, i.e., they have an absorber element which works in association with the rotational motion of an arm connected to the cable or conductor and to a supporting frame.

FIG. 2 of the aforementioned U.S. Pat. No. 4,346,255 illustrates a linear type vibration absorber operating on the above-described principles wherein the absorber element (a piston) is connected in a linear relationship between cables or conductors.

FIG. 1 shows a spacer damper type vibration absorber 50 of the type described in U.S. patent application Ser. No. 216,870, filed Dec. 16, 1980 (abandoned in favor of continuation-in-part application Ser. No. 300,751, filed Sept. 10, 1981), having a body portion 16, pivot axes 17 and 18, and conductor clamp arms 19/19a and 20/20a coupled to the body portion 16 for rotation about the axes 17 and 18 respectively. This damper also contains a torsional spring element (not shown) for restoring each of the arms 19/19a to a predetermined angular orientation with respect to the body portion 16.

When installed between the suspended conductors or cables 21 and 22, aeolin vibration and sub-conductor oscillation movements of the conductors cause relative rotation of the arms 19/19a and 20/20a with respect to the vibration absorber body 16, with such rotation being resisted by coulomb frictional means within said body.

FIG. 2 shows a torsional pendulum testing arrangement for testing and/or adjusting the torsional vibration absorber 50. A linear deflection transducer 11 is attached to the pendulum rod 27 or weight 28 for sensing the angular deflection thereof.

FIG. 3 shows a similar pendulum arrangement for testing the linear vibration absorber 60 wherein the pendulum rod 27 is rotationally supported by horizontal rod 10 mounted in bearings 24, and the linear type vibration absorber 60 is coupled to the weight 28.

The test pendulum is formed by inverting the spacer damper 50 shown in FIG. 1, and clamping its body 16 rigidly to a stationary platform 12 so that the conductor clamp arm is directed downward. The clamp arm 19/19a is extended by clamping a light weight rigid rod 27 to the conductor clamp to support a weight 28, which preferably comprises a high density metal. The weight 28 has a hole 29 therethrough for slidably receiving the rod 27, and a clamp 30 for securing the weight 28 at any desired position along the rod 27. Additional weights (not shown) of similar construction but of different masses are provided.

In order to detect and display information indicative of the logarithmic decrement of oscillation of the pendulum, the output of the transducer 11 is connected to a strip chart recorder 15, which generates a display of angular amplitude vs. time when the pendulum is oscillating.

The pendulum may be set into oscillation merely by manually deflecting the weight 28 so that the rod 27 and clamp arm 19/19a is moved away from the vertical position thereof.

In a vibrating conductor span damped by a vibration absorber, the decrement of the damped oscillation of the conductor is given by $$\text{ln Decrement } \sigma = \frac{\ln Y_n - 1}{Y_n} \approx \pi (D_c + D_s)/2 \sqrt{Tm} \quad (1)$$

where
$Y_n - 1$ = amplitude of a given oscillation cycle
$Y_n$ = amplitude of next succeeding oscillation cycle
m = conductor mass per unit length
T = conductor tension
$D_c$ = internal damping factor of conductor span
$D_s$ = damping factor of vibration absorber Equation (1) represents a sufficiently accurate approximation when $$\pi (D_c + D_s)/2 \sqrt{Tm} < 0.4 \quad (2)$$

Normally $D_c << D_s$, so that the logarithmic decrement $\sigma$ is given by $$\sigma = \frac{\ln Y_n - 1}{Y} \approx \frac{\pi D_s}{2 \sqrt{Tm}} \quad (3)$$

For a simple damped pendulum with a small deflection angle or angular amplitude $\theta$, the logarithmic decrement $\sigma_p$ is approximately (with sufficient accuracy when $\theta < 20°$) given by $$\sigma_p \approx \frac{D_p}{2MR^2 f_o} \quad (4)$$

where
$D_p$ = pendulum damping
M = pendulum mass
R = pendulum radius of gyration
$f_o$ = pendulum oscillation frequency Since the general forms of equations (3) and (4) are similar, the damped pendulum system shown in FIG. 3 can be viewed as a mechanical analog of the damped vibrating conductor system, by setting the damping $D_p$ equal to the desired value of $D_s$, viz.

$$D_p = k \sqrt{Tm} \quad (5)$$

where for dissipative vibration absorbers of the type described in the aforementioned U.S. Patent 4,346,255 $0.5 < k < 3$ as previously discussed.

Substituting equation (5) into equation (4), and solving for M, we have $$M = \frac{k \sqrt{Tm}}{2\sigma_p R^2 f_o} \quad (6)$$

$$W = \frac{kg \sqrt{Tm}}{2\sigma_p R^2 f_o} \quad (7)$$

where
g = acceleration of gravity
W = pendulum weight

For a simple pendulum with $\theta \leq 20°$ the oscillation frequency is given with sufficient accuracy by $$f_o = \frac{1}{2\pi} \sqrt{\frac{g}{R}} \quad (8)$$

while for a pendulum using a torsional spring with $\theta \leq 20°$, the oscillation frequency is given with sufficient accuracy by $$f_o = \frac{1}{2\pi} \sqrt{\frac{g}{R} + \frac{Sg}{WR^2}} \quad (9)$$

where S = torsional spring constant

In order to set a particular (adjustable) vibration absorber to a desired damping, utilizing the pendulum shown in FIG. 2, the following sequence of operations is first carried out:

1. The desired values of k (a value of 1 being typical) and the frequency $f_o$ at which the setting is to be made are selected;
2. An arbitrary value of $\sigma_p$ is chosen (a value on the order of ln 4 = 1.386 being typical);
3. The appropriate values of T and m are determined; and
4. The pendulum radius of gyration R and weight W are determined as follows:

From Equation (8) the radius of gyration is given by $$R = \frac{g}{(2\pi f_o)^2} \quad (10)$$

The value of R determined from Equation (10) is then inserted into Equation (7), along with the aforementioned values of k, T, m, $\sigma_p$, and $f_o$, and the pendulum weight W is calculated.

In order to utilize a torsional pendulum with the torsional vibration absorbers described in the aforementioned U.S. patent application Ser. No. 216,870, filed Dec. 16, 1980 (abandoned in favor of continuation-in-part application Ser. No. 300,751, filed Sept. 10, 1981) and U.S. Pat. Nos. 4,362,900 and 4,362,901, the damping $D_p$ must be altered to compensate for the fact that the geometry of the torsional vibration absorber arrangement as employed with a suspended cable is different from the linear absorber arrangement shown in FIG. 3. That is, as seen in FIG. 1 vertical conductor movement results in application of a torque to the vibration absorber equal to the vertical force multiplied by $(d\sin\phi)^2$.

Therefore, the damping set in the test apparatus must be multiplied by $(d\sin\phi)^2$ over that desired in the actual suspended cable installation. That is, substituting $k\sqrt{Tm} (d\sin\phi)^2$ for $k\sqrt{Tm}$ in Equation (7), we have $$W = \frac{kg \sqrt{Tm} \, d^2 \sin^2\phi}{2\sigma_p R^2 f_o} \quad (11)$$

In order to set a particular (adjustable) vibration absorber to a desired damping, utilizing a pendulum such as that shown in FIG. 2, the following sequence of operations is first carried out:

1. The value of the torsional spring constant S is determined, e.g., by adjusting the length and weight of the pendulum to cause it to oscillate at a desired test frequency $f_o$, measuring said length and weight, and utilizing Equation (9) to compute S.

The pendulum support rod mass should be small compared to the weight at the free end of the pendulum, and said weight should comprise a relatively high density material, so that the pendulum radius of gyration will be substantially equal to its length.

2. The desired values of k, T, m, d and $f_o$ are determined, and an arbitrary value of $\sigma_p$ is chosen (a value in the range of ln 2 to ln 4 being preferred);

3. The pendulum radius of gyration R (substantially equal to its length in the test arrangement) and weight W are determined by simultaneous solution of Equations (9) and (11).

Once the length and weight of the test pendulums in FIGS. 2 and 3 have been determined, the pendulum is set into oscillation at the frequency $f_o$. While the resulting oscillation frequency may differ slightly from the desired value, such a difference is not important since the damping produced by most of the vibration absorbers to be adjusted is essentially dissipative and therefore relatively independent of frequency.

The angular oscillation of the pendulum is detected by the transducer 11 and the strip chart recorder 15.

The damping of the vibration absorbers 50 and 60 in FIGS. 2 and 3 respectively is then adjusted (e.g. by increasing the pressure between the frictional members of the unit described in the aforementioned application Ser. No. 216,870, filed Dec. 16, 1980 (abandoned in favor of continuation-in-part application Ser. No. 300,751, filed Sept. 10, 1981) or by adjusting the orifice size of the units described in the aforementioned U.S. patents 4,362,900 and 4,362,901) until the logarithmic decrement of the pendulum, as observed on the strip chart recorder 15 has the initially selected arbitrary value thereof. Then the damping factor of the vibration absorber 60 will have the desired value.

The two test methods described above differ essentially in that Equation (11) is utilized to adjust the weight used for testing torsional absorbers, as shown in FIG. 2. The length of the pendulum is calculated from the axis of rotation of the spacer damper arm to the weight centroid in FIG. 2, and from the center of the pendulum support rod 10 to the weight centroid in FIG. 3.

What is claimed is:

1. A method for testing and/or adjusting a vibration absorber to be used to absorb vibration from a suspended cable, comprising the steps of:

determining the desired damping of said absorber, the desired oscillation frequency at which the test is to be conducted, and the tension and mass per unit length of the cable from which vibration is to be absorbed;

selecting a logarithmic decrement value to be utilized for test purposes;

providing a pendulum to be used as a mechanical analog of the suspended cable-vibration absorber system;

adjusting the weight and radius of gyration of said pendulum to cause said pendulum to oscillate at said frequency and with said logarithmic decrement when said damping factor has said desired value;

coupling said vibration absorber to said pendulum to damp the oscillation thereof;

setting said adjusted pendulum into oscillation; and displaying information responsive to the sensed amplitude and indicative of the logarithmic decrement of said oscillation.

2. The method according to claim 1, comprising the additional subsequent step of adjusting the damping factor of said vibration absorber so that the indicated logarithmic decrement is substantially equal to said selected logarithmic decrement value.

3. The method according to claim 1, wherein said pendulum is of the simple type and the pendulum radius of gyration and weight are determined by the following equations:

$$R = \frac{g}{(2\pi f_o)^2}$$

$$W = \frac{kg\sqrt{Tm}}{2\sigma_p R^2 f_o}$$

where
R = pendulum radius of gyration
W = pendulum weight
k = damping constant
g = acceleration of gravity
T = cable tension
m = cable mass per unit length
$\sigma_p$ = selected logarithmic decrement value
$f_o$ = desired oscillation frequency.

4. The method according to claim 1, wherein said pendulum is of the torsional type with a predetermined spring constant and the pendulum radius of gyration and weight are determined by the following equations:

$$f_o = \frac{1}{2\pi}\sqrt{\frac{g}{R} + \frac{Sg}{WR^2}}$$

$$W = \frac{kg\sqrt{Tm}\, d^2\sin^2\phi}{2\sigma_p R^2 f_o}$$

where
R = pendulum radius of gyration
S = pendulum spring constant
W = pendulum weight
k = damping constant
g = acceleration of gravity
T = cable tension
m = cable mass per unit length
$\sigma_p$ = selected logarithmic decrement value
$f_o$ = desired oscillation frequency.

5. The method according to claim 3 or 4, wherein $0.5 \leq k \leq 3$.

6. Apparatus for testing and/or adjusting a vibration absorber to be used to absorb vibration from a suspended cable, comprising:

a pendulum;

means for adjusting the weight and radius of gyration of said pendulum;

means for coupling said vibration absorber to said pendulum so as to damp any oscillation of said pendulum;

means for sensing the amplitude of oscillation of said pendulum; and display means coupled to said sensing means for displaying information indicative of the logarithmic decrement of said oscillation.

7. The apparatus according to claim 6, wherein said sensing means comprises an angular signal transducer.

8. The apparatus according to claim 6, wherein said display means comprises a strip chart recorder.

9. The apparatus according to claim 8, wherein said recorder has a linear time scale and a logarithmic amplitude scale.

10. The apparatus according to claim 6, wherein said display means comprises means for computing and displaying the numerical value of the logarithmic decrement of said oscillation.

11. A method for adjusting a vibration absorber to be used to absorb vibration from a suspended cable, comprising the steps of:
provide a pendulum having a radius of gyration and weight sufficient to cause the pendulum to oscillate at a desired test frequency with a selected logarithmic decrement when coupled to a vibration absorber having a desired damping factor;
coupling said vibration absorber to said pendulum to damp any oscillation thereof;
setting the pendulum into oscillation; and
adjusting the damping factor of said vibration absorber to cause the logarithmic decrement of said oscillation to be substantially equal to said selected logarithmic decrement.

12. The method according to claim 11, wherein said desired damping factor is between 0.5 and 3 times the mechanical impedance of said suspended cable.

* * * * *